(12) United States Patent
Schlegel

(10) Patent No.: US 10,435,206 B2
(45) Date of Patent: Oct. 8, 2019

(54) SEALABLE CONTAINER ARRANGEMENT

(71) Applicants: Andrea Wilhelm, Rohr (DE); Sven Schlegel, Großhabersdorf (DE)

(72) Inventor: Sven Schlegel, Großhabersdorf (DE)

(73) Assignee: MEDISCA PHARMACEUTIQUE INC., Québec (CA)

( * ) Notice: Subject to any disclaimer, the term of this patent is extended or adjusted under 35 U.S.C. 154(b) by 0 days.

(21) Appl. No.: 15/935,365

(22) Filed: Mar. 26, 2018

(65) Prior Publication Data
US 2018/0273255 A1 Sep. 27, 2018

(30) Foreign Application Priority Data
Mar. 27, 2017 (DE) .................. 10 2017 205 160

(51) Int. Cl.
B65D 41/04 (2006.01)
B65D 47/12 (2006.01)
B65D 53/02 (2006.01)
B65D 83/00 (2006.01)
F16J 13/12 (2006.01)
F16J 15/06 (2006.01)

(52) U.S. Cl.
CPC ....... B65D 47/122 (2013.01); B65D 41/0442 (2013.01); B65D 53/02 (2013.01); B65D 83/0005 (2013.01); F16J 13/12 (2013.01); F16J 15/062 (2013.01)

(58) Field of Classification Search
CPC .. B65D 41/0435; B65D 41/0442–0457; B65D 53/02; B65D 83/0005–005; F16J 13/12; B67D 3/007
See application file for complete search history.

(56) References Cited

U.S. PATENT DOCUMENTS

| | | | | |
|---|---|---|---|---|
| 1,180,929 A | * | 4/1916 | Keeran | B65D 41/28 215/277 |
| 2,051,518 A | * | 8/1936 | Cunningham | B05B 7/2408 220/325 |
| 3,240,398 A | * | 3/1966 | Dalton, Jr. | B05B 7/2408 222/464.1 |
| 3,255,907 A | * | 6/1966 | Eddy | B65D 41/0428 215/329 |
| 3,270,920 A | * | 9/1966 | Nessler | B05B 7/2472 222/136 |
| 3,315,832 A | * | 4/1967 | Scott | B65D 41/0442 215/261 |

(Continued)

FOREIGN PATENT DOCUMENTS

| | | |
|---|---|---|
| DE | 40 02 982 A1 | 8/1990 |
| DE | 297 06 611 A1 | 7/1997 |

(Continued)

Primary Examiner — Paul R Durand
Assistant Examiner — Randall A Gruby
(74) Attorney, Agent, or Firm — McGlew and Tuttle, P.C.

(57) ABSTRACT

A closable container arrangement comprises a container, which comprises a container material and has a container longitudinal axis and a container connecting element, a lid which comprises a lid material, a sealing element, which comprises a sealing material, for sealing the lid on the container, wherein the sealing material comprises a hardness which is less than the hardness of the container material and/or is less than the hardness of the lid material.

21 Claims, 3 Drawing Sheets

(56) References Cited

U.S. PATENT DOCUMENTS

| | | | | |
|---|---|---|---|---|
| 3,432,104 | A * | 3/1969 | Kaltenbach | B05B 7/2408 239/328 |
| 3,494,497 | A * | 2/1970 | Vercillo | B21D 51/50 215/318 |
| 3,507,309 | A * | 4/1970 | Johnson | B05B 9/0805 137/557 |
| 4,896,782 | A * | 1/1990 | Hawkins | B65D 41/0442 215/276 |
| 4,989,787 | A * | 2/1991 | Nikkel | B05B 7/0087 239/346 |
| 5,060,813 | A * | 10/1991 | Gollasch | B65D 41/0414 215/329 |
| 5,225,125 | A * | 7/1993 | Wildfeuer | B65D 43/0218 264/102 |
| 5,445,293 | A * | 8/1995 | Schutz | B65D 45/02 220/315 |
| 5,881,907 | A * | 3/1999 | Schutz | B65D 41/083 220/644 |
| 6,299,022 | B1 * | 10/2001 | Bublewitz | B05C 17/00506 222/105 |
| 6,564,970 | B1 * | 5/2003 | Walch | B05C 17/00516 222/327 |
| 7,806,879 | B2 * | 10/2010 | Brooks | A61M 1/0017 604/317 |
| 8,281,945 | B2 * | 10/2012 | Roussy | B65D 41/0428 215/333 |
| 8,424,706 | B2 * | 4/2013 | Robertson | B65D 41/0442 215/317 |
| 8,596,477 | B2 * | 12/2013 | Kras | B65D 41/0442 215/276 |
| 2008/0197148 | A1 * | 8/2008 | Illy | A47J 47/01 222/152 |
| 2009/0108089 | A1 * | 4/2009 | Handzel | B05B 7/241 239/8 |
| 2012/0160936 | A1 * | 6/2012 | Brummitt | B05B 7/045 239/322 |
| 2013/0153073 | A1 * | 6/2013 | Barth | B60T 1/10 138/31 |
| 2014/0070432 | A1 * | 3/2014 | Tatera | B01F 15/0224 261/34.1 |
| 2017/0101254 | A1 * | 4/2017 | Tomesch | B65D 83/0005 |
| 2017/0189833 | A1 * | 7/2017 | Lee | B01D 17/0217 |
| 2018/0202604 | A1 * | 7/2018 | Sorg | B05C 17/00576 |
| 2018/0252191 | A1 * | 9/2018 | Pitcel | F02M 37/007 |
| 2018/0312328 | A1 * | 11/2018 | Sugawara | B65D 83/663 |

FOREIGN PATENT DOCUMENTS

| | | |
|---|---|---|
| DE | 199 63 218 A1 | 7/2001 |
| DE | 102 24 369 A1 | 12/2003 |
| EP | 2 468 414 A1 | 6/2012 |
| WO | 02/087 986 A1 | 11/2002 |
| WO | 2010/041075 A2 | 4/2010 |
| WO | WO 2015178709 * | 11/2015 |

* cited by examiner

SEALABLE CONTAINER ARRANGEMENT

CROSS-REFERENCES TO RELATED APPLICATIONS

This application claims the priority of German Patent Application, Serial No. 10 2017 205 160.4, filed Mar. 27, 2017, pursuant to 35 U.S.C. 119(a)-(d), the content of which is incorporated herein by reference in its entirety as if fully set forth herein.

FIELD OF THE INVENTION

The invention relates to a sealable container arrangement.

BACKGROUND OF THE INVENTION

WO 02/087 986 A1 discloses a container having a seal on the container lid. The seal is integrally moulded on the lid as a sealing lip. Further containers with a seal are known from DE 40 02 982 A1, DE 297 06 611 U1 and DE 102 24 369 A1.

SUMMARY OF THE INVENTION

It is an object of the present invention to increase the sealing of a container interior of a container arrangement of the generic type.

Said object is achieved according to the invention by a sealable container arrangement having
  a. a container which comprises a container material and has a container longitudinal axis and a container connecting element,
  b. a lid which comprises a lid material and
    i. is connectable to the container and
    ii. comprises a lid connecting element which corresponds to the container connecting element,
    iii. comprises a collar and a cover plate which is connected in one piece to the collar,
  c. a sealing element, which comprises a sealing material, for sealing the lid on the container,
  characterized in that
  d. the sealing material comprises a hardness which is less than the hardness of the container material and/or is less than the hardness of the lid material
  e. the lid comprises a circumferential groove in which the sealing element is arranged in a captive manner, wherein the groove comprises a groove width ($B_N$) which is smaller than or equal to a thickness of the sealing element,
  f. a displaceable bottom which is arranged in a sealed manner along the container longitudinal axis in the container is provided.

It has been recognized according to the invention that the tightness of a container arrangement is thus improved when use is made of a sealing element produced from a sealing material, the hardness of which is less than the hardness of a container material of a container and/or than the hardness of a lid material of a lid. The sealing action is improved. Tests have shown that the sealing element produced from the softer sealing material comprises an improved sealing action in particular compared to the sealing lip disclosed in the prior art. The sealing lip consists of the same material as the lid and comprises a structural flexibility as a result of being realized in a particularly thin manner. Compared to a container according to WO 02/087 986 A1, the tightness is more than tripled and is, in particular, approximately 360% of the tightness of the container arrangement according to WO 02/087 986 A1. The container comprises a container longitudinal axis and a container connecting element. The lid is connectable to the container and comprises for this purpose a lid connecting element which corresponds with the container connecting element. In particular, the connecting elements are realized as thread such that the lid is advantageously screw-connectable onto the container. In particular, an exterior thread is provided on the container and an interior thread is provided on the lid. As an alternative to this, a snap-on-type connection is conceivable in such a manner that a radially outwardly protruding, in particular circumferential web is arranged on the container. In a corresponding manner, the lid can comprise an undercut element which engages behind the circumferential web on the container and consequently ensures a reliable connection between the container and the lid.

Furthermore, according to the invention, a lid is provided with a circumferential groove in which the sealing element is arranged in a captive manner. The lid simplifies the mounting of the sealing element. The sealing element is arranged reliably on the lid. The risk of the sealing element being lost when the lid is removed from the container is excluded.

The configuration of the groove which comprises a groove width which is smaller than or equal to a thickness of the sealing element, ensures a reliable arrangement of the sealing element in the groove. The sealing element is arranged in a captive manner in the groove. When the container arrangement is opened and when the lid is removed from the container, the sealing element remains on the lid and is, in particular, not ejected due to gravity. The sealing action is additionally improved.

A displaceable bottom which is arranged in a sealed manner along the container longitudinal axis in the container, enables a product to be delivered in an advantageous manner from the container arrangement.

The sealing element serves for sealing the lid on the container. In particular, an, in particular ring-shaped, end face of the container is sealed with the sealing element. The sealing element therefore seals, in particular, the end face. A sealing face, which is oriented radially with reference to the container longitudinal axis, is avoided as a result. The end face comprises, in particular, a surface normal which is oriented parallel to the container longitudinal axis. The sealing element is realized so as to be flexibly deformable. The sealing material, from which the sealing element is produced, is in particular elastic. The sealing element is arranged, in particular, in such a manner between the container and the lid, which is connected thereto, that reliable sealing is ensured. Where the internal pressure in an interior which is closed by the container arrangement is additionally increased, the sealing element, on account of the interior pressure, can additionally adhere to the container and/or the lid and the sealing effect can increase in an additional manner. The container arrangement is suitable, in particular, for the preparation of cosmetic and/or pharmaceutical masses, as where an agitation process is necessary for these, air inclusion is able to be reliably ruled out.

A separate sealing element according to the invention simplifies the production of the container arrangement. The sealing element can be realized as a separate element, in particular, as an O-ring which is placed into the groove of the lid. The sealing element is available, in particular, in large quantities and at favourable costs as a standardized element. The separate sealing element can also be realized as a flat sealing ring.

As an alternative to this, it is possible to mould the sealing element integrally in one piece on the lid or on the container, in particular as a result of two component injection moulding. For example, a silicone ring can be integrally moulded in one piece on the lid from a thermoplastic material, in particular polyethylene and/or polypropylene, as a result of two component injection moulding technology.

An arrangement of the sealing element in a pre-stressed manner, in particular in the axial direction with reference to the container longitudinal axis, ensures that the interior of the container arrangement is already reliably sealed as a result of fitting the lid onto the container. The handling of the container arrangement is unsusceptible to error. In particular, the sealing element and/or the thread connection of the container and the lid is/are realized in such a manner that manually screwing the lid onto the container ensures reliable sealing of the container arrangement.

In the case of a container arrangement with the lid connected, the end face of the container being arranged inside the groove, the sealing effect is additionally increased.

An arrangement, wherein the end face defines a reduced groove depth ($T_{N,red}$) which is smaller than the height of the sealing element, wherein $T_{N,red}$ is less than 0.95 times the height of the sealing element in particular, provides an increased sealing effect.

A container arrangement, wherein the container is arranged at a spacing from the lid, in particular as a result of a radial gap, in the region of the groove, ensures that the sealing action is effected exclusively by the sealing element. There is no direct contact surface between the lid and the container. As a result, a contact surface between two comparatively hard contact partners is excluded, which could open due to increased internal pressure in the container.

A container which comprises a rotationally symmetrical inside surface is suitable, in particular, for the production of cosmetic and/or pharmaceutical products, such as ointments or creams.

A central spout which is closable, in particular sealed, by means of a cap, on the one hand improves the dosed delivery of the product from the container arrangement. On the other hand, the spout can serve as access for an agitating tool in order to prepare the product in the container arrangement.

A sealing material which comprises a hardness of between Shore A 15 and Shore A 95, in particular between Shore A 20 and Shore A 90, and in particular between Shore A 30 and Shore A 60, enables particularly advantageous sealing of the lid on the container.

An exemplary embodiment of the invention is explained in more detail below by way of the drawing.

DESCRIPTION OF THE PREFERRED EMBODIMENT

Figure 1:
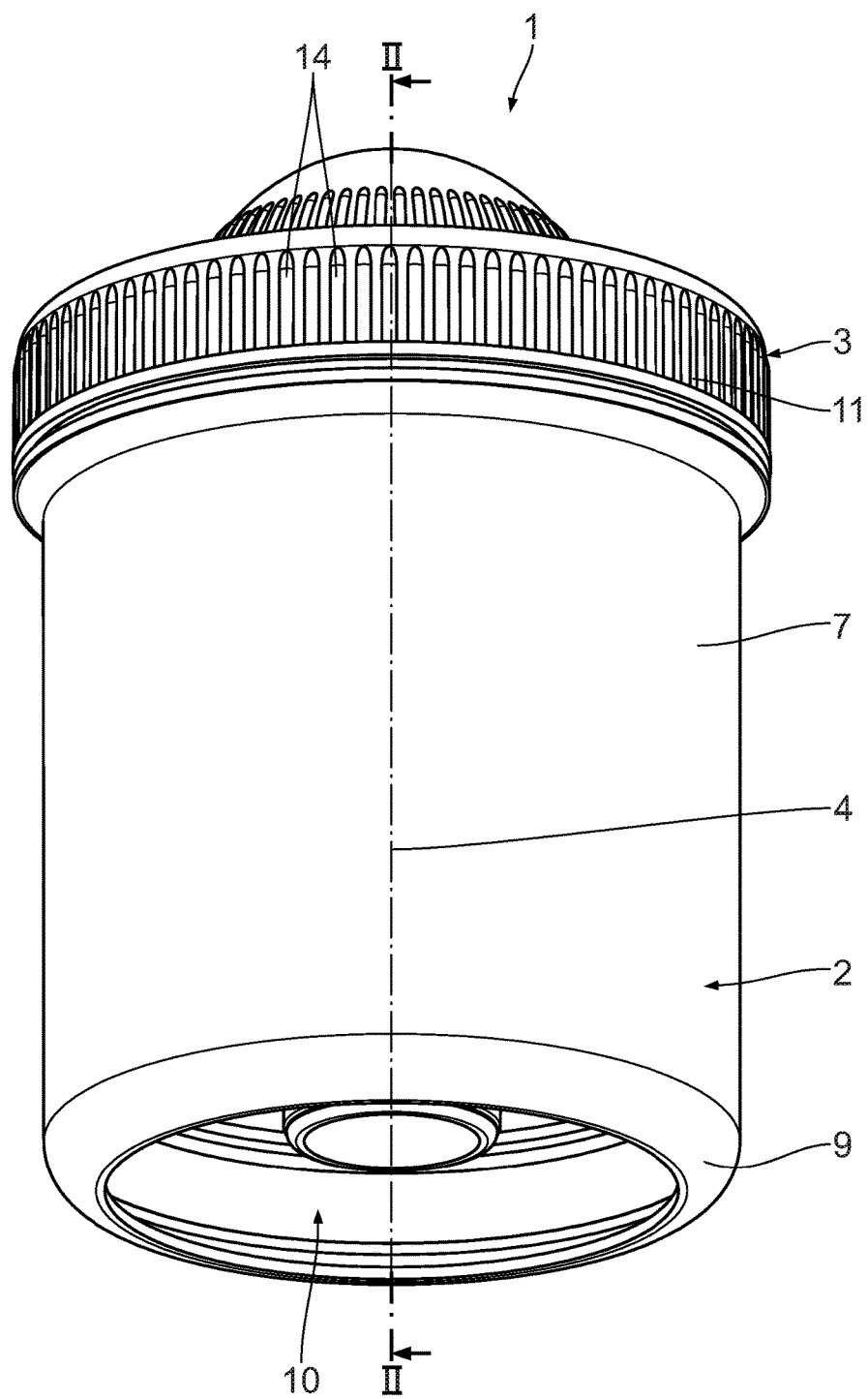
FIG. 1 shows a perspective representation of a container arrangement according to the invention.
Figure 2:
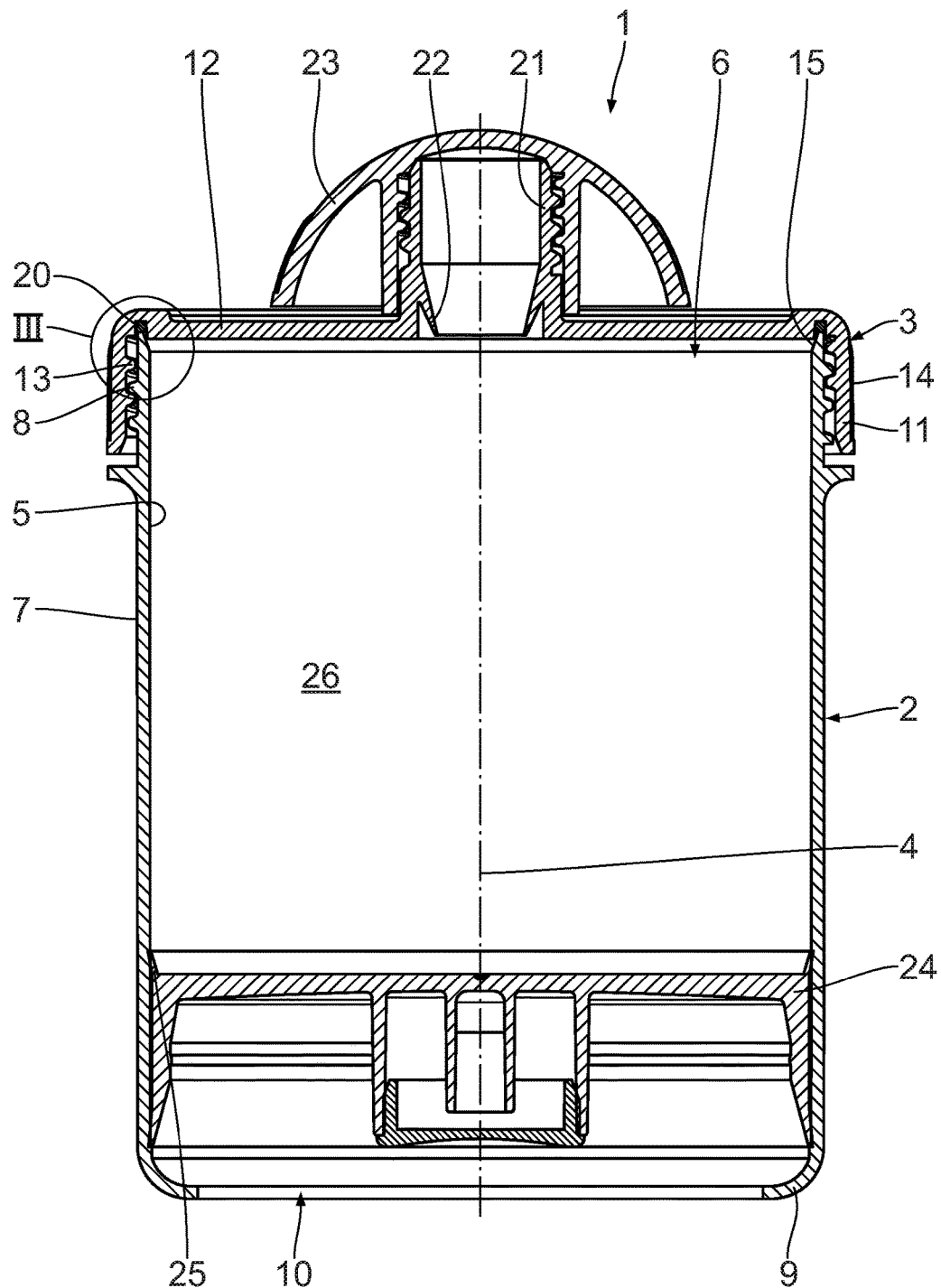
FIG. 2 shows a longitudinal section according to the line of intersection II-II in FIG. 1.
Figure 3:
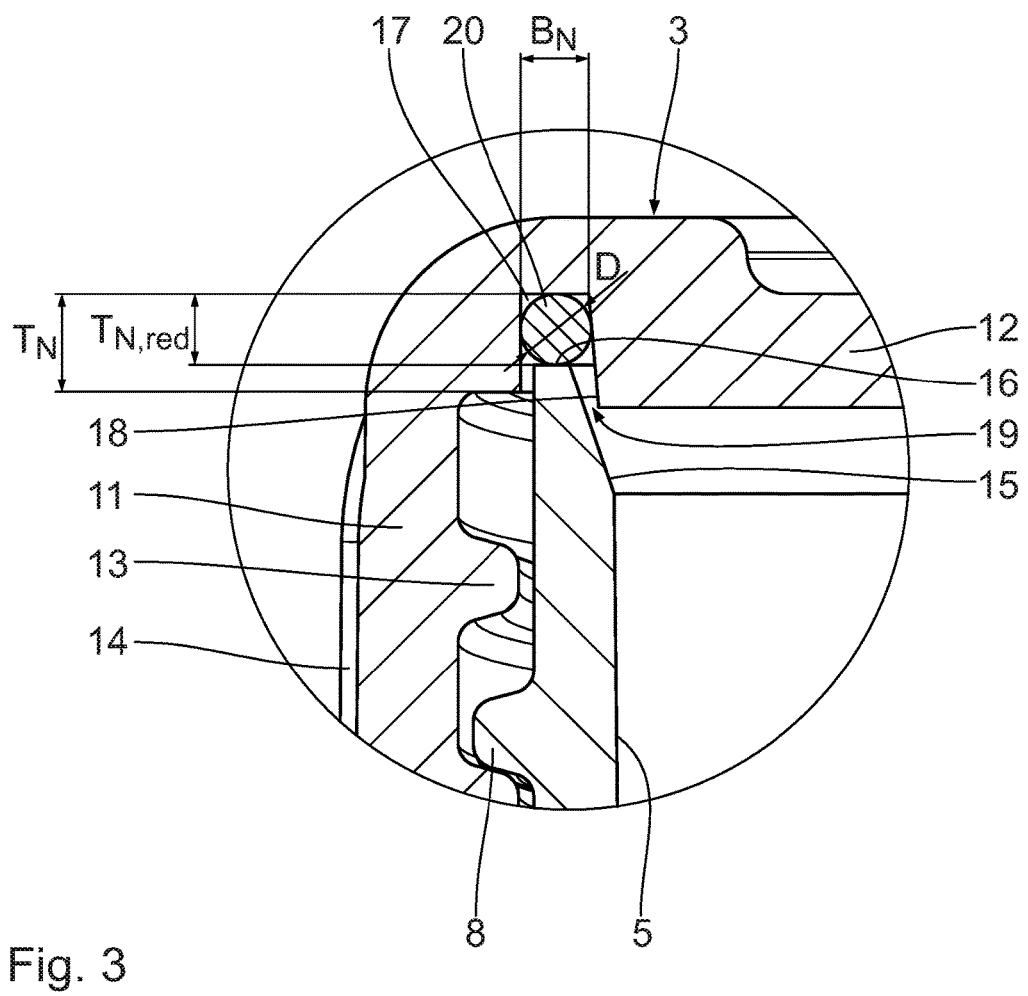
FIG. 3 shows an enlarged detailed representation of the detail III in FIG. 2.

The container arrangement designated as a whole in FIGS. 1 to 3 by way of the reference 1 is realized as a pot. A storage and delivery vessel, which is used chiefly for semi-solid preparations such as ointments, pastes or creams, is designated as a pot. It is particularly advantageous that the semi-solid preparation, which serves, in particular, for cosmetic and/or pharmaceutical purposes, is also able to be prepared directly in the pot 1. The risk of contaminants is reduced and, in particular, excluded.

The container arrangement 1 includes a container 2 which is closable by means of a lid 3.

The container 2 is realized in a substantially hollow cylindrical manner and comprises a container longitudinal axis 4. The container 2 is produced as a one-piece moulded part, in particular as a result of plastics material injection moulding, in particular from a thermoplastic material, in particular from polypropylene.

The container 2 is produced from a thermoplastic material, in particular from polypropylene. The hardness of the container material is between Shore D 50 and Shore D 90, in particular Shore D 60 and Shore D 80 and in particular Shore D 65 and Shore D 75.

The container 2 comprises an inside surface 5 which is rotationally symmetrical with reference to the container longitudinal axis 4. The inside surface 5 is realized as a shell wall of a circular cylinder. The outer contour of the container 2 can essentially be configured freely and, in particular, can be realized in a non-rotationally symmetrical manner.

At a first end along the container longitudinal axis 4, the container 2 comprises a container opening 6 which is closed by the lid 3. A container connecting element 8 in the form of a thread is integrally moulded in one piece on the outside 7 of the container 2 in the region of the container opening 6. The container connecting element 8 is an external thread. According to the exemplary embodiment shown, the container connecting element 8 is a triple trapezoidal thread.

The container 2 comprises a chamfer 15 on its inside surface 5 in the region of the container opening 6. The chamfer 15 forms a lead-in chamfer for the lid 3. The chamfer 15 facilitates the fitting and screw-connecting of the lid 3 on the container 2. The container 2 comprises a ring-face-shaped end face 16 in the region of the container opening 6 at the first end.

At a second end, which is located along the container longitudinal axis 4 opposite the first end, the container 2 comprises a substantially ring-face-shaped standing surface 9, by way of which the container 2 is stood in a defined manner on a base. The standing surface 9 is realized as a rounding of the cylinder shell wall of the container 2. The standing surface 9 comprises a central opening 10.

The lid 3 comprises a substantially circular cylindrical collar 11 and a cover plate 12. The collar 11 encompasses the container 2 in the region of the container opening 6. On an inside of the collar 11, a lid connecting element 13 is realized in the form of an internal thread which corresponds with the external thread of the container 2. The lid connecting element 13 is realized as a triple trapezoidal thread.

The lid 3 is produced from a thermoplastic material, in particular polypropylene. The hardness of the lid material is between Shore D 50 and Shore D 90, in particular Shore D 60 and Shore D 80 and in particular Shore D 65 and Shore D 75.

Gripping grooves 14 are provided on an outside surface of the collar 11 in order to facilitate the opening of the container arrangement, that is to say the unscrewing of the threaded connection between the container 2 and the lid 3. The gripping grooves 14 are realized as elevations on the outside surface of the collar 11. The gripping grooves 14 extend along the container longitudinal axis 4. The gripping grooves 14 are arranged along the outer circumference of the collar 11.

The cover plate 12, which is connected, in particular in one piece, to the collar 11, extends substantially over the container opening 6. The cover plate 12 covers up the container opening 6.

A rectangular groove 17 is provided in the lid 3 between the collar 11 and the cover plate 12 in the radial direction with reference to the container longitudinal axis 4. The rectangular groove 17 comprises a groove width $B_N$ and a groove depth $T_N$. The groove depth $T_N$ is oriented parallel to the container longitudinal axis 4. The groove width $B_N$ is oriented radially to the container longitudinal axis. With the container arrangement 1 in the closed state, the container 2 projects with the end face 16 into the groove 17. A reduced groove depth $T_{N,red}$ is fixed as a result.

As shown in FIG. 3, the groove 17 is not perfectly rectangular. In particular, the inner side flank 18 of the groove 17 is arranged in an inclined manner in relation to the container longitudinal axis 4. A conically tapering development is produced for the groove 17 as a result.

The lid 3, in particular the cover plate 12, with the container arrangement 1 in the closed state, is arranged spaced from the container 2 by a radial gap 19, in particular in the region of the groove 17 and in particular in the region of the chamfer 15. There is no direct contact surface between the container 2 and the lid 3—with the exception of the threaded connection 8, 13.

A sealing element 20 in the form of an O-ring is placed into the groove 17. The sealing element 20 comprises a circular cross-sectional area with a diameter D which corresponds to a thickness of the sealing element 20 and to a height of the sealing element 20. The thickness of the sealing element is oriented radially to the container longitudinal axis 4. The height of the sealing element is oriented parallel to the container longitudinal axis 4. Other geometric configurations of the sealing element 20 are also possible, such as, in particular, a flat sealing ring which comprises a rectangular cross-sectional area.

In the representation according to FIGS. 2 and 3 of the container arrangement 1, where the lid 3 is fitted on the container 2, the sealing element 20 is arranged in the groove 17 in a pre-stressed manner. The pre-stressing is produced as a result of the sealing element 20 being arranged in a deformed manner in the groove 17. Deformation is produced as a result of the groove width $B_N$ being smaller than the thickness of the sealing element 20. This means that the sealing element 20 is arranged in the groove 17 pre-stressed in the radial direction with reference to the container longitudinal axis.

Axial pre-stressing of the sealing element 20 is produced as a result of the end face 16 of the container 2 protruding so far into the groove 17 that the reduced groove depth is smaller than the height of the sealing element 20. As a result of interaction between the threads of the container connecting element 8 and the lid connecting element 13, the end face 16 is pressed into the groove 17 and in particular against the sealing element 20.

The sealing element 20 comprises a sealing material with a hardness of between Shore A 30 and Shore A 60. The lid 3 comprises a central spout 21 on which is provided a circumferential sealing lip 22 which faces the container opening 6. An external thread, onto which a cap 23 is screw-connectable, is provided on the spout 21. The cap 23 is realized in the shape of a spherical calotte. The cap 23 is arranged in a sealed manner on the spout 21. The lid 3 is realized in a completely tight manner as a result of the cap 23.

A bottom 24, which is arranged in a sealed manner by means of an integrated bottom sealing lip 25 on the inside surface 5 of the container 2, is arranged in the container 2. The bottom 24 is realized substantially in the shape of a cylinder disc and is arranged in the container 2 so as to be displaceable along the container longitudinal axis 4. The bottom 24 is manageable from outside the container arrangement via the opening 10. The bottom 24 can be displaced along the container longitudinal axis 4 manually or by means of an aid.

The container 2, the lid 3 and the bottom 24 delimit a substantially cylindrical interior 26 of the container arrangement 1. The interior 26 is closable in a sealed manner.

Experiments have been carried out to test the tightness with the container arrangement 1 and with a corresponding container arrangement in WO 02/087 986 A1. The test was run according to the specifications of an SPC inspection. The interior 26 was filled with water and the bottom 24 pressed at a test force along the container longitudinal axis 4 in the direction of the lid 3. The pressing force was measured. The force at which water exits from the interior 26 serves as the characteristic value for the tightness of the container arrangement 1. Said pressing force for the container 2 according to the invention with a capacity of 100 ml was 18 kg. The pressing force in the case of a similar-volume container according to the prior art was 5 kg.

What is claimed is:

1. A sealable container arrangement comprising:
   a container comprising a container material, a container longitudinal axis and a container connecting element;
   a lid comprising a lid material, the lid being connectable to the container and the lid comprising a lid connecting element corresponding to the container connecting element, the lid further comprising a collar and a cover plate connected in one piece to the collar;
   a sealing element for sealing the lid on the container, the sealing element comprising a sealing material, wherein the sealing material comprises a hardness which is at least one of less than the hardness of the container material and less than the hardness of the lid material, the lid comprising a circumferential groove in which the sealing element is arranged in a captive manner, wherein the groove comprises a groove width less than or equal to a thickness of the sealing element, the groove having an inclined inner flank, wherein a displaceable bottom is arranged in a sealed manner along the container longitudinal axis in the container, wherein a radial gap is provided between the inclined inner flank and the container when the container arrangement is in a closed state, wherein, with the lid connected, an end face of the container is arranged inside the groove, the inclined inner flank comprising an inclined flank surface, wherein an end portion of the container comprises the end face and a chamfered inner surface, the chamfered inner surface and the inclined flank surface defining the radial gap.

2. A container arrangement according to claim 1, wherein the width of the groove is less than 0.98 times a thickness of the sealing element.

3. A container arrangement according to claim 1 wherein the groove comprises a groove depth which is greater than a height of the sealing element.

4. A container arrangement according to claim 3 wherein the groove depth is greater than 1.05 times a height of the sealing element.

5. A container arrangement according to claim 1, wherein the sealing element is realized as a separate element.

6. A container arrangement according to claim 5, wherein the sealing element is realized in the form of an O-ring.

7. A container arrangement according to one claim 1, wherein the sealing element is arranged in the groove in a pre-stressed manner.

8. A container arrangement according to claim 1, wherein the end face defines a reduced groove depth which is smaller than the height of the sealing element, the end face being perpendicular to the longitudinal axis.

9. A container arrangement according to claim 8, wherein the reduced groove depth is less than 0.95 times the height of the sealing element.

10. A container arrangement according to claim 1, wherein the container comprises a rotationally symmetrical inside surface.

11. A container arrangement according to claim 1, wherein the lid comprises a central spout which is closable by a cap.

12. A container arrangement according to claim 1, wherein the lid comprises a central spout which is sealed by a cap.

13. A container arrangement according to claim 1, wherein the sealing material comprises a hardness of between Shore A 15 and Shore A 95.

14. A container arrangement according to claim 13, wherein the sealing material comprises a hardness of between Shore A 20 and Shore A 90.

15. A container arrangement according to claim 13, wherein the sealing material comprises a hardness of between Shore A 30 and Shore A 60.

16. A sealable container arrangement comprising:
a container comprising a container material, a container longitudinal axis and a container connecting element;
a lid comprising a lid material, the lid being connectable to the container and the lid comprising a lid connecting element corresponding to the container connecting element, the lid further comprising a collar and a cover plate connected in one piece to the collar;
a sealing element for sealing the lid on the container, the sealing element comprising a sealing material, wherein the sealing material comprises a hardness which is at least one of less than the hardness of the container material and less than the hardness of the lid material, the lid comprising a circumferential groove in which the sealing element is arranged in a captive manner, wherein the groove comprises a groove width less than or equal to a thickness of the sealing element, the groove having an inclined inner flank, wherein a displaceable bottom is arranged in a sealed manner along the container longitudinal axis in the container, wherein the container has a chamfered opening, wherein a radial gap is provided between the inclined inner flank of the groove and the chamfered opening when the container arrangement is in a closed state.

17. A container arrangement according to claim 16, wherein the width of the groove is less than 0.98 times a thickness of the sealing element.

18. A container arrangement according to claim 16, wherein the groove comprises a groove depth which is greater than a height of the sealing element.

19. A container arrangement according to claim 18, wherein the groove depth is greater than 1.05 times a height of the sealing element.

20. A container arrangement according to claim 16, wherein the sealing element is realized as a separate element.

21. A container arrangement according to claim 16, wherein the lid comprises a central spout which is closable by a cap.

* * * * *